Feb. 24, 1948. A. D. SMITH 2,436,496
PROCESS FOR THE CATALYTIC TREATMENT OF HYDROCARBON OIL
Filed Jan. 11, 1946
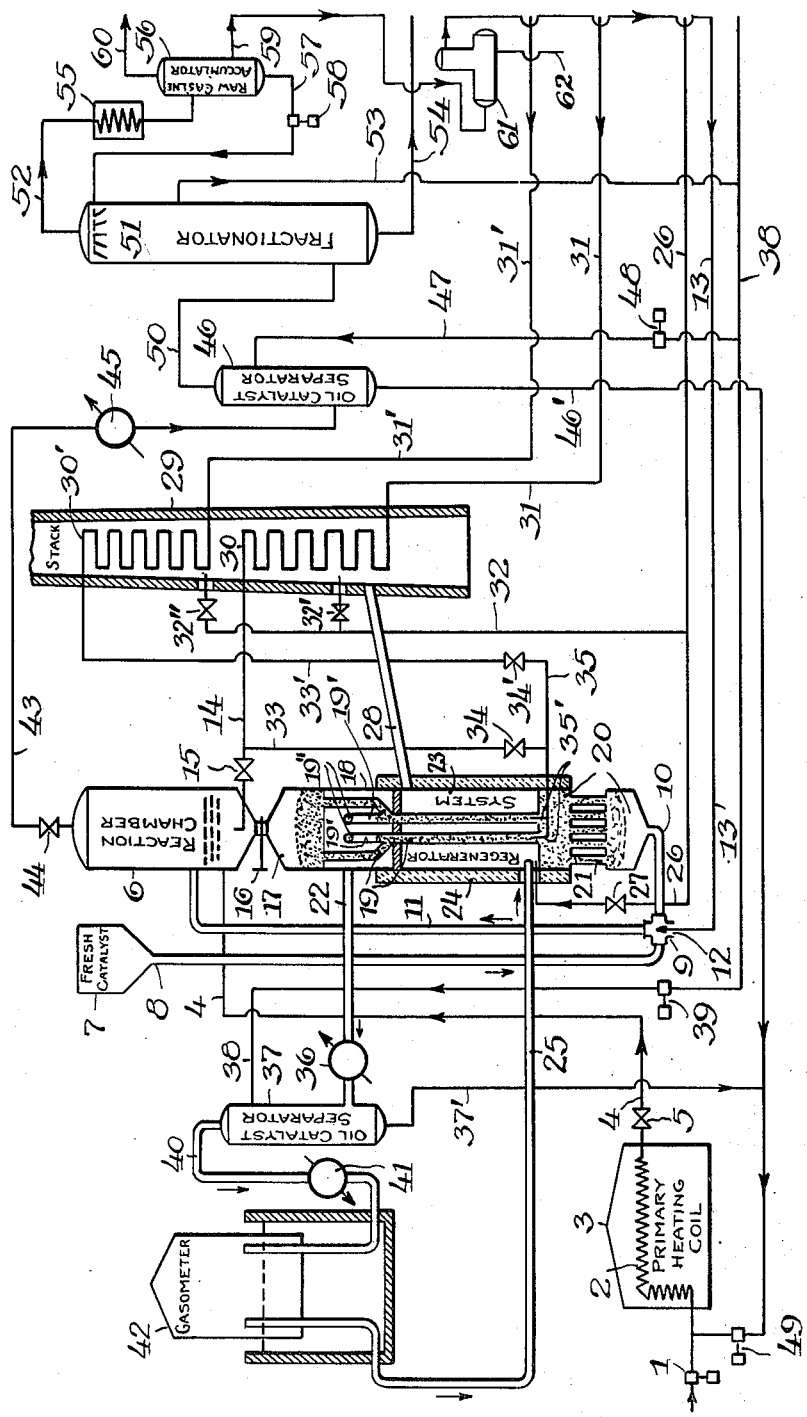
INVENTOR.
Arthur D. Smith Patented Feb. 24, 1948

2,436,496

UNITED STATES PATENT OFFICE 2,436,496

PROCESS FOR THE CATALYTIC TREATMENT OF HYDROCARBON OIL

Arthur D. Smith, Park Ridge, Ill., assignor to Adsorptive Process Company, Chicago, Ill., a corporation of Nevada Application January 11, 1946, Serial No. 640,591

6 Claims. (Cl. 196—52)

The invention relates to an improvement in process for the catalytic treatment of hydrocarbon oil and more particularly to a process for the catalytic treatment of petroleum hydrocarbon oil of relatively low octane rating, while essentially in vapor phase and under transforming conditions of heat and pressure, with a divided dispersed mineral catalyst; production of high antiknock gasoline and regeneration of catalyst under a balanced exothermic and endothermic reaction being important objectives.

A known catalytic process for producing gasoline of high octane rating comprises contacting a hydrocarbon oil while essentially in vapor phase and under transforming conditions of heat and pressure with a dispersed divided catalyst and continuously regenerating catalyst particles deactivated through adsorption of carbon by burning off such carbon in a current of air.

Somewhat similar initial procedure is recited in my co-pending application for Patent Serial No. 637,186, filed December 26, 1945, but where regeneration of spent catalyst is effected under exclusion of free oxygen in a current of superheated steam.

The first mentioned known process where the regeneration step is conducted wholly in exothermic phase involves danger of overheating the catalyst particles with attendant reduction in directive catalytic power, and although de-activation of catalyst is prevented in the process of the co-pending application, the complete exclusion of free oxygen in the regeneration step in such process prolongs the reaction at this stage or alternately requires a greater amount of superheated steam per unit of regeneration time.

The present invention is an improvement over the first of the foregoing processes in that regeneration of the catalyst is effected in an atmosphere of superheated steam commingled with such limited quantity of free oxygen that only a predetermined minor portion of the total adsorbed carbon combines with such oxygen in exothermic reaction, the balance or major portion of such carbon concurrently and co-actively undergoing endothermic metathesis with a compensating quantity of the steam. In such balanced regeneration of catalyst dominated by an endothermic reaction, not only is impairment of the catalyst from overheating prevented, but the reaction of the carbon with the superheated steam produces a composite combustible gas comprising carbon monoxide, carbon dioxide and hydrogen. Where such gas is admixed with nitrogen, as is the case where the free oxygen is supplied in the form of air, the gas still obtains of good calorific power in the preferred method of carrying out the invention and may be advantageously employed in the process in a manner subsequently to be described.

The present invention is also an improvement over the process recited in the above mentioned co-pending application in that, while retaining in the regeneration step the advantages of non-impairment of the directive activity of the catalyst and the co-production of a composite combustible gas, the method of causing a predetermined minor portion of the total adsorbed carbon to combine with free oxygen speeds up the regenerating reaction and under a reduced superheated steam consumption.

In carrying out the process, I preferably employ as charging stock a petroleum hydrocarbon such as gas oil, kerosene distillate, naphtha or a mixture of two or more of such products; in short, so-called clean stock, although heavier oils can be used, but with reduced yield of high octane gasoline. The charging stock is continuously fed to a conventional preheating coil and the effluent therefrom, in a vaporized or substantially vaporized condition, and under transforming conditions of heat and pressure, is conducted to a reaction zone where it is continuously contacted with a suitable divided catalyst in dispersed phase. The spent catalyst from such operation, after the greater portion of its associated heavy hydrocarbon is stripped by steam, drops into the charge hopper of a regeneration zone, the latter preferably comprising a plurality of tubes or channels connecting the charge hopper with a discharge hopper. The longer lower portions of the tubes extend in vertical disposition through a heat resistant and refractory lined combustion chamber which is provided near the bottom with conventional gas and oil burners, and near the top with a breeching for conducting the products of combustion to a stack. In the latter, though not limited to such location, is conveniently disposed an air superheating coil and a steam superheating coil in the path of the combustion gases. Such coils may be further heated, as required, by additionally supplied fuel from an extraneous source.

The combustion chamber serves as an auxiliary means for externally heating the tubular system through which the spent catalyst continuously descends in its process of regeneration, the fuel being preferably the before mentioned composite combustible gas, supplemented if necessary, by extraneously supplied fuel. The primary source of heat imparted to the spent catalyst is, however, through the agency of the commingled superheated steam and superheated air continuously injected into the lower portion of each tubular unit and supplied from the respective above mentioned superheating coils.

The temperature of the superheated steam and superheated air, the ratio of the commingled steam and air to the catalyst, and the degree of heat maintained in the combustion chamber is so adjusted that the catalyst is heated in the tubular elements between 900° F. and 1300° F.; or at such temperature within the previously mentioned conditions as to effect, without impairment of the directive activity of the catalyst, combustion of a minor portion of the total adsorbed carbon with the free oxygen component of the air and metathesis between the balance or major portion of the total adsorbed carbon and the superheated steam.

To achieve the objectives of speeding up regeneration of the catalyst under a decreased superheated steam consumption without overheating the catalyst particles and at the same time produce a composite combustible gas of good calorific power, I limit the minor portion of adsorbed carbon to approximately 35% of the total and preferably base the amount of air employed on approximately 20 to 25% of such total. To ascertain the actual quantity of the adsorbed carbon present and thus determine the concrete amount of commingled steam and air to be employed, I first introduce as a preliminary procedure, sufficient superheated steam to remove the total adsorbed carbon from the spent catalyst as evidenced by the absence of carbon on the regenerated catalyst particles, maintaining in the meantime such minimum temperature that the carbon monoxide dioxide constituents of the composite combustible gas produced, respectively occur in the approximate volumetric ratio of 1.5 to 1; such ratio corresponding closely to 60% by weight of the carbon being converted to the monoxide, and 40% to the dioxide.

Since 1 lb. of carbon burned to carbon dioxide liberates 14,650 B. t. u. and 1 lb. burned to the monoxide liberates 14,650—10,220 or 4,430 B. t. u., 1 lb. of carbon converted as above cited would generate $(0.6 \times 4,430) + (0.4 \times 14,650)$ or 8,518 B. t. u. As the latter figure is available for decomposition of the steam, and since 1 lb. of water absorbs 6,900 B. t. u. in such decomposition, the theoretical quantity of steam required would be 8518/6900 or 1.23 lbs. per lb. of total carbon removed.

By dividing the quantity of superheated steam actually supplied per unit time by the theoretical figure of 1.23 lbs., the apparent amount of adsorbed carbon removed from the spent catalyst per unit time is thus ascertained, such apparent quantity comprehending the excess steam required over the theoretical. I then introduce with the steam sufficient superheated air based on the apparent total carbon removed per unit time to supply the necessary free oxygen to combine with the predetermined minor portion of such carbon, reduce the steam supplied proportionately and thereafter continuously inject the superheated steam and air commingled in the thus determined ratio. If, for example, 20% is elected as the predetermined minor portion and such carbon burns to CO and $CO_2$ in the cited ratio, the theoretical amount of steam required would be reduced 20%, which latter figure would be applied to the total steam employed and the consumption thereof reduced accordingly. If the superheated air obtains at the same temperature as the superheated steam, less fuel will be required to be supplied to the combustion chamber, and the speedier will be regeneration reaction per unit passage of catalyst.

Due to the above variations, as well as to the amount of hydrocarbon retained by the spent catalyst after stripping, the composition of the composite combustible gas will vary considerably, and in extreme cases should its nitrogen content approach a point that the gas ceases to be of good calorific value, the tubular elements may be dispensed with and the spent catalyst regenerated in a simple baffled combustion chamber.

Where 20% of the total adsorbed carbon is permitted to combine with free oxygen, a typical analysis of the composite gas would be approximately as follows: methane 5%, carbon monoxide 16%, carbon dioxide 11%, hydrogen 20%, nitrogen 44% and alkanes and alkenes of the $C_2$-$C_4$ series 4%; the latter fraction and possibly the methane being probably derived from the hydrocarbon retained by the catalyst after stripping.

The composite gas produced in the above described operation, together with any excess steam and entrained catalyst particles, is trapped off under a less head pressure than obtains in the main tubular sections, through suitable extensions which are manifolded to a main gas line which latter may be further provided with an eductive means if desired. The gas, after passing through a heat exchanger where it is reduced to a less than cracking temperature, enters an oil catalyst separator where any entrained catalyst is removed, and after further cooling to condense any free steam, the gas finally enters a gasometer from whence it is supplied as fuel to the combustion chamber in the manner aforesaid.

The main body of the regenerated catalyst, together with whatever amount of fresh catalyst is required to replace loss, is continuously introduced into the reaction chamber, preferably in a stream of hydrocarbon gas supplied through a suitable jet means; such carrier gas being conveniently a by-product of the process, for example, gas from the stabilizer in which the raw gasoline produced in the process is depropanized.

The catalyst may be any of the natural adsorptive catalysts such as activated clays, or treated bentonite; or synthetic aluminum silicates; and more broadly any suitable catalyst that may be handled and regenerated in the manner previously described; the specific catalyst employed not being claimed as a part of the invention.

The transformed vapor from the reaction zone, after first passing through a heat exchanger where its temperature is reduced below a cracking temperature, is stripped of entrained catalyst particles in an oil-catalyst separator and then passes to a fractionator from which raw gasoline vapor is released to a condenser, light gas oil or recycle stock is discharged as a side stream and heavier oil is withdrawn from the bottom as a residual product.

The light gas oil may be recycled in its entirety direct to the process as a part of the charging stock, but I prefer to first employ a portion of the former as a wash oil in the before mentioned oil-catalyst separators, returning the oil-catalyst the charging stock and thus reducing catalyst loss to a minimum.

The raw gasoline flowing from the condenser passes to an accumulator from which a small portion is returned to the fractionator as trim stock, the balance being conducted to a stabilizer where it is depropanized according to standard practice. Uncondensed vapor from the raw gasoline accumulator is preferably subjected to one of the known polymerization processes.

In order that the invention may be more clearly understood, reference is made to the accompanying drawing which denotes a flow diagram of the process.

Referring to the drawing, the pressure pump 1 continuously delivers charging stock to the heating coil 2 disposed in the furnace 3, which is heated by any convenient source of fuel. The coil effluent, in a vaporized or substantially vaporized state and obtaining at a transforming temperature, flows through the line 4, as controlled by the pressure release valve 5, to the reaction chamber 6, where under a pressure which will commonly lie between 75 and 1000 lbs., depending on the composition of the charging stock and catalyst employed, it commingles with the latter in dispersed phase.

Fresh catalyst, in a state of subdivision that can be readily propelled and dispersed in a current of fluid carrier hydrocarbon such as any of the $C_1$–$C_3$ alkanes or alkenes, or a mixture thereof, flows downward from the bin 7 through the line 8 to the manifold 9, from whence, admixed with hot regenerated catalyst supplied to the said manifold through the line 10 (after the process is in regular operation), it is injected to the reaction chamber in a current of the said carrier hydrocarbon through the line 11 by the agency of the jet 12. The carrier hydrocarbon supplied through the line 13 and delivered under a sufficient pressure to operate the jet 12, may conveniently be as previously stated, hydrocarbon gas derived from stabilization of the gasoline produced by the process.

The temperature of the effluent from coil 2 and its degree of completeness of vaporization will be governed to a considerable extent by the type, quantity and temperature of the regenerated catalyst, the coil outlet temperature being so adjusted in relation to the factors immediately above mentioned, that the transforming reaction in the reaction chamber 6 occurs essentially in vapor phase. The exact temperature maintained in the reaction chamber will depend on the nature of the charging stock, type of catalyst, its quantitative radio to the oil processed and whether a moderate yield of exceptionally high octane gasoline, or a maximum return of moderately high octane gasoline is the objective; so that no hard and fast figure can be given, although the operative temperature in the reaction chamber will usually lie between 750° F. and 1200° F.

Spent catalyst is stripped from the greater portion of its associated heavy hydrocarbon formed during the transforming reaction, by a stream of superheated steam supplied through the line 14, as governed by valve 15. It then discharges from the reaction chamber 6, as controlled by valve 16, to the charge hopper 17 of the regenerator 18, and thence continuously descends through a plurality of tubes or channels 19 fabricated of heat resistant alloy, to the discharge hopper 20, which is provided with cooling tubes 21. The upper sections of the tubes or channels 19 terminate in Y bends with the lateral or longer branches thereof respectively connecting to the charge hopper and the shorter vertically disposed branches 19' to manifolds 19'' which in turn connect to the gas main 22. The longer lower sections of the tubes or channels 19 extend in vertical disposition through the combustion chamber 23 which is encased by a refractory wall 24; the shell of the regenerator system being partially cut away in the drawing to show the above mentioned parts.

The combustion chamber is preferably heated primarily by the before mentioned composite combustible gas as supplied through line 25, and is further equipped with an auxiliary fuel supply (gas or oil) delivered through line 26, as controlled by valve 27; the products of combustion escaping through the breeching 28 to the stack 29. In the latter, and installed in the path of the hot combustion gases, is disposed the steam superheating coil 30 and the air superheating coil 30'; the former being supplied by steam from any suitable source through the line 31 and the latter with air through line 31'. An auxiliary fuel supply (gas or oil) for heating the coils is provided through lines 26 and 32, as controlled by valves 32' and 32'', thus ensuring attainment of the necessary degree of superheat.

The steam, superheated to a predetermined temperature being approximately between 900° F. and 1300° F. and under the requisite pressure, is delivered through lines 14 and 33, as controlled by valve 34, to the manifold 35. Here it is admixed with the superheated air supplied through line 33', as controlled by valve 34', the commingled steam and air flowing through the multiple jets 35' and upwardly through the plurality of tubes 19 in countercurrent relationship to the descending hot spent catalyst which may be further externally heated, if required, by the means previously described.

The steam and the oxygen of the air in its upward passage chemically enters into reaction with the carbon adsorbed by the catalyst during the transforming reaction, according to the several general equations $C+O=CO$, $CO+O=CO_2$, $C+H_2O=CO+H_2$ and $CO+H_2O=CO_2+H_2$, thus forming the major part of the previously described composite combustible gas and regenerating the catalyst. Since the latter in its descent continuously fills the tubes 19, but does not back up materially in the extensions 19', the difference in head pressure prevents the gas produced from entering the charge hopper 17; it therefore flowing through the said extensions to the gas main 22, which, if desired, may be provided with an eductive means (not shown).

The gas flowing through the main 22, which may if desired, be provided with an eductive means (not shown), passes through the heat exchanger 36 wherein its temperature is reduced to slightly below an oil cracking temperature. The gas next enters the oil catalyst separator 37 where any entrained catalyst particles are removed in a stream of wash oil, conveniently gas oil, or recycle oil produced by the process and fed to the separator by line 38, as controlled by pump 39. The thus cleansed gas leaves the separator 37 by the line 40, and after passing through the exchanger 41 where any steam content is precipitated as water, finally enters the gasometer 42, from whence it is supplied as fuel to the combustion chamber 23 through the line 25 in the manner previously described.

Transformed vapor released from the reaction chamber 6 through the line 43, as controlled by valve 44, after passing through the heat exchanger 45, enters the second oil catalyst separator 46 where any entrained catalyst particles are removed in a stream of the same wash oil as supplied separator 37; such oil being fed through line 47, as controlled by pump 48. The catalyst particles removed in separators 37 and 46 are respectively withdrawn therefrom through lines 37' and 46' as an oil-catalyst slurry, such slurry being introduced to coil 2 by pump 49 to form a portion of the charging stock; the amount of catalyst passing through coil 2 and thence to the reaction chamber being a relatively small portion of the total.

The transformed vapor, freed from catalyst in the separator 46, flows through the line 50 to the fractionator 51, from which raw gasoline vapor, light gas oil or recycle stock, and residual oil are respectively withdrawn through lines 52, 53 and 54. Raw gasoline, condensed in condenser 55, flows to the accumulator 56, from which a portion is returned to the fractionator as trim stock through line 57 and pump 58; the balance flowing through line 59 to a stabilizer 61 for treatment according to standard practice, stabilized gasoline being withdrawn from the system through line 62 and uncondensed alkanes returned through line 13. Uncondensed vapor, released from the system through line 60, is preferably treated by some known polymerization process.

The process is not limited to the exact pressures, temperatures and quantities herein given by way of an example, nor to the means depicted, which represents in diagrammatic form only one embodiment of apparatus suitable for carrying out the invention.

What I claim as new and desire to protect by Letters Patent is:

1. A process for the catalytic conversion of hydrocarbons which comprises: introducing to a conversion zone a stream of fluid hydrocarbon preheated to a transforming temperature and a second stream of fluid hydrocarbon containing dispersed catalyst particles, effecting upon commingling of said streams conversion of a portion of said fluid hydrocarbon into gasoline of high anti-knock value and another portion into carbon with concomitant adsorption of said carbon by said catalyst particles, releasing converted and unconverted hydrocarbon vapor from said conversion zone to an oil-catalyst separation zone and freeing therein said vapor from entrained catalyst particles as an oil-catalyst slurry dispersed in a stream of wash hydrocarbon oil, conducting the washed vapor to a fractionation zone and discharging therefrom said gasoline of high anti-knock value as a vapor and recycle oil as a liquid, condensing the gasoline vapor to liquid gasoline and returning recycle oil to the oil-catalyst separation zone as said wash oil, commingling the oil-catalyst slurry with the first mentioned stream of fluid hydrocarbon, discharging from said conversion zone to a regeneration zone disposed in a combustion zone catalyst particles coated with adsorbed carbon and flowing such particles through the regeneration zone in countercurrent contact with superheated steam commingled with free oxygen wherein such oxygen is present in quantity only sufficient to combine with a predetermined minor portion of said adsorbed carbon, respectively effecting in said contact combination of said minor portion with said free oxygen and metathesis between the major portion of said adsorbed carbon and said steam with production of regenerated catalyst particles and a combustible gas comprising carbon monoxide, carbon dioxide and hydrogen, conducting the combustible gas to said combustion zone, and dispersing the regenerated catalyst particles in said second stream of fluid hydrocarbon with introduction thereof to said conversion zone in the manner aforesaid.

2. A process for the catalytic conversion of hydrocarbons which comprises: introducing to a conversion zone a stream of fluid hydrocarbon preheated to a transforming temperature and a second stream of hydrocarbon gas comprising methane and containing dispersed catalyst particles, effecting upon commingling of said streams conversion of a portion of said fluid hydrocarbon into gasoline of high anti-knock value and another portion into carbon with concomitant adsorption of said carbon by said catalyst particles, releasing converted and unconverted hydrocarbon vapor from said conversion zone to an oil-catalyst separation zone and freeing therein said vapor from entrained catalyst particles as an oil-catalyst slurry dispersed in a stream of wash hydrocarbon oil, conducting the washed vapor to a fractionation zone and discharging therefrom said gasoline of high anti-knock value as a vapor and recycle oil as a liquid, condensing the gasoline vapor to liquid gasoline and returning recycle oil to the oil-catalyst separation zone as said wash oil, commingling the oil-catalyst slurry with said stream of fluid hydrocarbon, discharging from said conversion zone to a regeneration zone disposed in a combustion zone catalyst particles coated with adsorbed carbon and flowing such particles through the regeneration zone in countercurrent contact with a stream of commingled superheated steam and air wherein such air is present in quantity only sufficient to supply the necessary free oxygen for combination with a predetermined minor portion of said adsorbed carbon, respectively effecting in said contact combination of said minor portion with said free oxygen and metathesis between the major portion of said adsorbed carbon and said steam with production of regenerated catalyst particles and a combustible gas comprising carbon monoxide, carbon dioxide, hydrogen and nitrogen, conducting the combustible gas to said combustion zone, and dispersing the regenerated catalyst particles in said stream of hydrocarbon gas comprising methane with introduction thereof to said conversion zone in the manner aforesaid.

3. A process for the catalytic conversion of hydrocarbons which comprises: introducing to a conversion zone a stream of fluid hydrocarbon preheated to a transforming temperature and a stream comprising alkanes of lower boiling point than gasoline and containing dispersed catalyst particles, effecting upon commingling of said streams conversion of a portion of said fluid hydrocarbon into gasoline of high anti-knock value and another portion into carbon with concomitant adsorption of said carbon by said catalyst particles, releasing converted and unconverted hydrocarbon vapor from said conversion zone to an oil-catalyst separation zone and freeing therein said vapor from entrained catalyst particles as an oil-catalyst slurry dispersed in a stream of wash hydrocarbon oil, conducting the washed vapor to a fractionating zone and discharging therefrom said gasoline of high anti-knock value as a vapor and recycle oil as a liquid, condensing the gasoline vapor to liquid gasoline and separating out uncondensed alkanes, reslurries so obtained to the system as a part of turning recycle oil to the oil-catalyst separation zone as said wash oil, commingling the oil-catalyst slurry with said stream of fluid hydrocarbon, discharging from said conversion zone to a regeneration zone disposed in a combustion zone catalyst particles coated with adsorbed carbon and flowing such particles through the regeneration zone in countercurrent contact with a stream of commingled superheated steam and air wherein such air is present in quantity only sufficient to supply the necessary free oxygen for combination with a predetermined minor portion of said adsorbed carbon, respectively effecting in said contact combination of said minor portion with said free oxygen and metathesis between the major portion of said adsorbed carbon and said steam with production of regenerated catalyst particles and a combustible gas comprising carbon monoxide, carbon dioxide, hydrogen and nitrogen, conducting the combustible gas to said combustion zone, and dispersing the regenerated catalyst particles in a portion of said uncondensed alkanes to form said stream comprising alkanes of lower boiling point than gasoline with introduction thereof to said conversion zone in the manner aforesaid.

4. In a cyclic process for the catalytic conversion of hydrocarbons wherein a fluid hydrocarbon obtaining at a transforming temperature is contacted in a conversion zone with dispersed catalyst particles with attendant conversion of a portion of said fluid hydrocarbon into gasoline and another portion into carbon and wherein the catalyst particles become spent through adsorption of said carbon: the steps of discharging the spent catalyst particles from said conversion zone to a regeneration zone disposed in a combustion zone; flowing said spent catalyst particles through said regeneration zone in countercurrent contact with a commingled mixture of steam and free oxygen superheated to a reactive temperature with the adsorbed carbon; respectively employing only sufficient said free oxygen to combine with a predetermined minor portion of said adsorbed carbon per unit flow of said spent catalyst particles and only sufficient said steam to effect metathesis with the remainder of said adsorbed carbon; producing through such removal of carbon regenerated catalyst particles and a combustible gas substantially free from free oxygen and steam, comprising carbon dioxide, carbon monoxide and hydrogen; conducting said gas to, and effecting combustion thereof in said combustion zone; utilizing the heat of such combustion to help maintain said spent catalyst particles and said steam at the temperature of said metathesis; and dispersing said regenerated catalyst particles in a stream of fluid hydrocarbon with introduction thereof to said conversion zone under the conditions aforesaid; all steps affecting the temperature conditions during regeneration being continuous, whereby substantially constant regenerating temperatures can be maintained.

5. In a cyclic process for the conversion of hydrocarbons wherein a fluid hydrocarbon obtaining under transforming conditions of heat and pressure is contacted with dispersed catalyst particles and wherein such particles become spent through adsorption of carbon: the steps of discharging the spent catalyst particles from said conversion zone to a regeneration zone disposed in a combustion zone; flowing said spent catalyst particles through said regeneration zone in countercurrent contact with a commingled stream of steam and air superheated to a reactive temperature with the adsorbed carbon; respectively employing enough said air to afford a free oxygen content only sufficient to combine with a predetermined minor portion of said adsorbed carbon per unit flow of said spent catalyst particles and only sufficient said steam to effect metathesis with the remainder of said adsorbed carbon; producing through such removal of carbon regenerated catalyst particles and a combustible gas substantially free from free oxygen and steam, comprising carbon dioxide, carbon monoxide, hydrogen and nitrogen; conducting said gas to, and effecting combustion thereof in said combustion zone; utilizing the heat of such combustion to help maintain said spent catalyst particles and said steam at the temperature of said metathesis; and dispersing said regenerated catalyst particles in a stream of fluid hydrocarbon with introduction thereof to said conversion zone under the conditions aforesaid; all steps affecting the temperature conditions during regeneration being continuous, whereby substantially constant regenerating temperatures can be maintained.

6. In a process for the conversion of hydrocarbons wherein a fluid hydrocarbon obtaining under transforming conditions of heat and pressure is contacted with dispersed catalyst particles and wherein such particles become spent through adsorption of carbon: the steps of discharging the spent catalyst particles from said conversion zone to a regeneration zone disposed in a combustion zone; flowing said spent catalyst particles through said regeneration zone in countercurrent contact with a commingled stream of steam and air superheated to a predetermined temperature approximately between 900° F. and 1300° F.; respectively employing enough said air to afford a free oxygen content only sufficient to combine with a predetermined minor portion of said adsorbed carbon per unit flow of said spent catalyst particles and only sufficient steam to effect metathesis with the remainder of said adsorbed carbon; producing through such removal of carbon regenerated catalyst particles and a combustible gas comprising carbon dioxide, carbon monoxide, hydrogen and nitrogen, substantially free from free oxygen and steam; conducting said gas to, and effecting combustion thereof in said combustion zone; and utilizing the heat of such combustion to help maintain said spent catalyst particles and said commingled stream of steam and air to said predetermined temperature; all steps affecting the temperature conditions during regeneration being continuous, whereby substantially constant regenerating temperatures can be maintained.

ARTHUR D. SMITH.

REFERENCES CITED

The following references are of record in the file of this patent:

UNITED STATES PATENTS

| Number | Name | Date |
| --- | --- | --- |
| 2,239,801 | Voorhees I | Apr. 29, 1941 |
| 2,261,151 | Fast | Nov. 4, 1941 |
| 2,284,603 | Belchetz et al. | May 26, 1942 |
| 2,328,178 | Teter | Aug. 31, 1943 |
| 2,342,856 | Hall | Feb. 29, 1944 |
| 2,345,487 | Liedholm | Mar. 28, 1944 |
| 2,353,508 | Schulze | July 11, 1944 |
| 2,378,342 | Voorhees et al II | June 12, 1945 |
| 2,378,531 | Becker | June 19, 1945 |
| 2,379,711 | Hemminger | July 3, 1945 |
| 2,380,391 | Bates | July 31, 1945 |
| 2,398,186 | Loy | Apr. 9, 1946 |

Certificate of Correction

Patent No: 2,436,496. February 24, 1948.

ARTHUR D. SMITH

It is hereby certified that errors appear in the printed specification of the above numbered patent requiring correction as follows: Column 3, line 7, for "ot fhe" read *of the*; line 31, after "monoxide" insert the words *and carbon*; column 4, line 64, after "oil-catalyst" second occurrence, insert *slurries so obtained to the system as a part of*; column 5, line 45, for "radio" read *ratio*; column 8, line 65, claim 3, strike out "slurries so obtained to the system as a part of"; and that the said Letters Patent should be read with these corrections therein that the same may conform to the record of the case in the Patent Office.

Signed and sealed this 18th day of May, A. D. 1948.

[SEAL]

THOMAS F. MURPHY,
*Assistant Commissioner of Patents.*